United States Patent
Hoshino (10) Patent No.: US 6,956,688 B2
(45) Date of Patent: Oct. 18, 2005

(54) VARIABLE WIDTH OPTICAL SLIT MECHANISM

(75) Inventor: Sakae Hoshino, Tokyo (JP)

(73) Assignee: Advantest Corporation, Tokyo (JP)

(*) Notice: Subject to any disclaimer, the term of this patent is extended or adjusted under 35 U.S.C. 154(b) by 0 days.

(21) Appl. No.: 10/470,451

(22) PCT Filed: Feb. 19, 2002

(86) PCT No.: PCT/JP02/01431
§ 371 (c)(1), (2), (4) Date: Jul. 24, 2003

(87) PCT Pub. No.: WO02/066941
PCT Pub. Date: Aug. 29, 2002

(65) Prior Publication Data
US 2004/0070807 A1 Apr. 15, 2004

(30) Foreign Application Priority Data
Feb. 20, 2001 (JP) ........................................ 2001-043011

(51) Int. Cl.[7] .............................................. G02B 26/02

(52) U.S. Cl. ........................................................ 359/232

(58) Field of Search ................................ 359/232, 234, 359/235, 227, 894, 230

(56) References Cited

U.S. PATENT DOCUMENTS 5,384,662 A 1/1995 Andresen et al.
5,661,589 A 8/1997 Meyer

FOREIGN PATENT DOCUMENTS

| JP | 62-168416 | 10/1987 |
| JP | 534201 | 2/1993 |
| JP | 76698 | 1/1995 |
| JP | 7198595 | 8/1995 |
| JP | 10111175 | 4/1998 |

*Primary Examiner*—Euncha P. Cherry
(74) *Attorney, Agent, or Firm*—David N. Lathrop, Esq.; Gallagher & Lathrop (57) ABSTRACT

There is provided a variable width optical slit mechanism capable of controlling the width of a slit with high accuracy in wide range of temperatures. A pair of conductive carriages is movably mounted on a conductive guide rail in the state that the carriages are not in contact with the guide rail by use of insulative rolling elements, or alternatively, a pair of conductive carriages is movably mounted on an insulative guide rail by use of conductive rolling elements. A pair of slit forming members is mounted to the pair of carriages, respectively. An elastic force is given to the carriages for energizing them such that they move toward each other, thereby to always bring the slit forming members into contact with each other to make the width of a slit zero. When a slit is formed, the carriages move away from each other against the elastic force.

9 Claims, 7 Drawing Sheets

VARIABLE WIDTH OPTICAL SLIT MECHANISM

TECHNICAL FIELD

The present invention relates to a variable width optical slit mechanism adapted to be suitably used in an optical instrument such as a spectroscope, and more particularly, to a variable width optical slit mechanism that is constructed such that when the width of the slit is zero, the origin signal is generated.

BACKGROUND ART

For example, in an optical spectrum analyzer, there is used at least one slit mechanism in order to extract a required spectrum component from a dispersed incident light. The slit mechanism must be configured such that the width of the slit can be varied depending upon a spectrum component to be extracted, and if the slit width cannot be set with high accuracy, it is impossible to extract only a required spectrum component. That is, since a slit formed by the slit mechanism exercises an important influence on the resolving power (resolution) of an optical spectrum analyzer, it is necessary that the slit mechanism forms a slit having a required width with accuracy as high as possible.

Heretofore, there have been proposed various types of variable width optical slit mechanisms, and a prior art slit mechanism disclosed in, for example, Japanese Patent Application No. 08-264691 (refer to Japanese Patent Application Public Disclosure No. 10-111175) filed on Oct. 4, 1996 by the same applicant as that of the present application will be described with reference to FIGS. 6 to 8.

Figure 6:
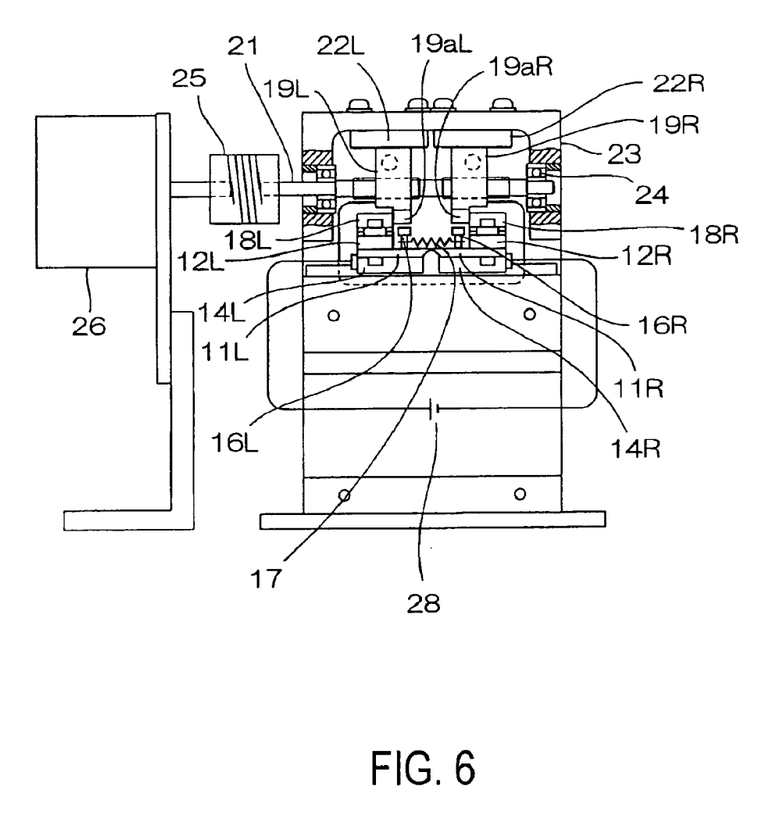
FIG. 6 is a front view showing the whole construction of a prior art variable width optical slit mechanism, a portion of which is shown in section.
Figure 7:
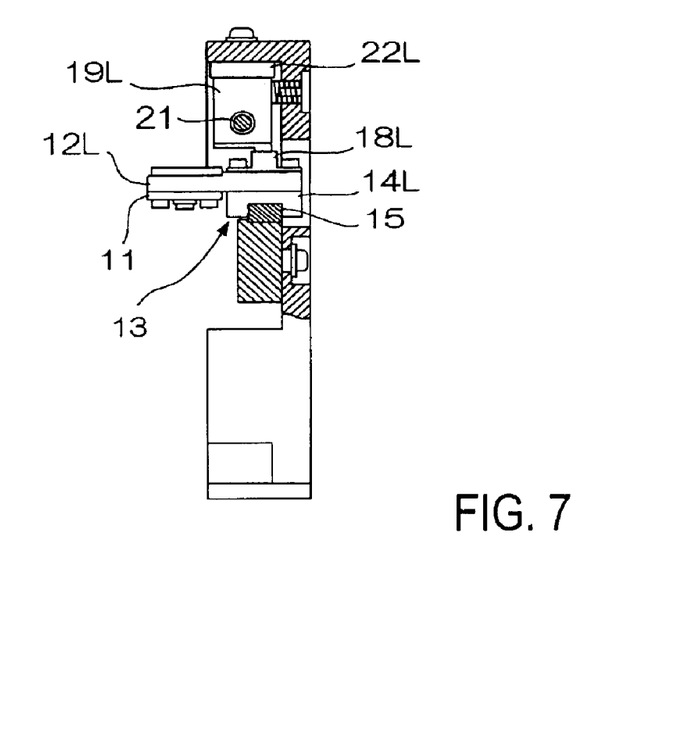
FIG. 7 is a sectional view taken along the longitudinal direction of a slit mechanism main body shown in FIG. 6.
Figure 8:
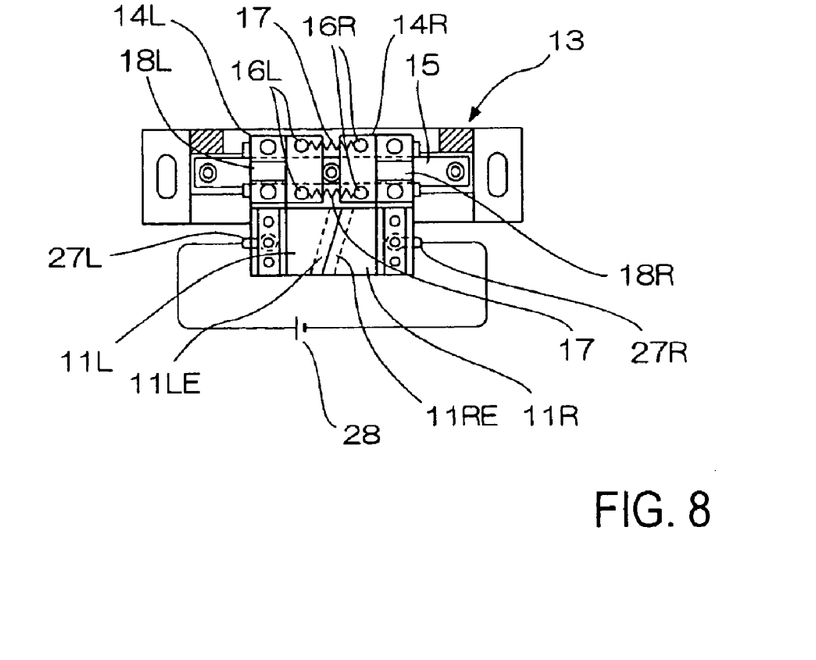
FIG. 8 is a plan view showing a linear guide, slit forming members, and blocks of the slit mechanism main body shown in FIG. 6 taken out therefrom.

FIG. 6 is a front view showing the whole construction of a variable width optical slit mechanism a portion of which is shown in section, that is disclosed in the above-mentioned Japanese Patent Application No. 08-264691, FIG. 7 is a sectional view taken along a longitudinal direction (vertical direction) of the slit mechanism main body shown in FIG. 6, and FIG. 8 is a plan view showing a linear guide, slit forming members, and blocks that are taken out of the slit mechanism main body shown in FIG. 6. The illustrated variable width optical slit mechanism comprises the slit mechanism main body that includes various components or members for forming a slit having a required width, and a drive part that includes a pulse motor or stepper motor 26 for rotatively driving a feed screw 21 of the slit mechanism main body. The feed screw 21 will be discussed later on.

The slit mechanism main body comprises: a frame 23; a pair of slit forming members 11L and 11R; a pair of slit forming member supports 12L and 12R on which the slit forming members 11L and 11R are mounted respectively; a linear guide 13 that is constituted by a guide rail 15 of a generally rectangle in section mounted on the frame 23 at a predetermined position thereof in the horizontal direction, and a pair of carriages 14L and 14R movably supported on the guide rail in a straddle-type; blocks 18L and 18R that are mounted on the top surfaces of the supports 12L and 12R respectively; a feed screw 21 that is rotatably mounted on the frame 23 at a predetermined position thereof above the supports 12L and 12R in the horizontal direction; a pair of nuts 19L and 19R that are engaged with the feed screw 21; a pair of slide guides 22L and 22R that guide the nuts 19L and 19R such that while the nuts 19L and 19R are moved by revolution of the feed screw 21, they can move straight in the axial direction of the feed screw 21; and a spring 17 that gives to the pair of slit forming members 11L and 11R a force always energizing the slit forming members 11L and 11R to approach each other.

The supports 12L and 12R are long and narrow plate-like members each having a generally rectangular shape in plan in this example, and are disposed in such manner that the major sides thereof form substantially a right angle with the longitudinal direction of the guide rail 15. The bottom surfaces of the rear sides (the right side portions in FIG. 7) of the supports 12L and 12R are respectively mounted on the carriages 14L and 14R each having a generally square shape in plan in this example, and on the top surfaces of the rear sides thereof are mounted the blocks 18L and 18R, respectively. The slit forming members 11L and 11R are mounted on the bottom surfaces of the front sides (the left side portions in FIG. 7) of the supports 12L and 12R in such manner that their slit forming edges 11LE and 11RE each having a knife-edge shape are opposed to each other, the front sides of the supports 12L and 12R extending ahead of the carriages 14L, 14R and the frame 23. A slit of a required width through which a light should pass is formed between the slit forming edges 11LE and 11RE of the pair of slit forming members 11L and 11R. Further, FIGS. 6 and 8 show the state that the slit forming edges 11LE and 11RE of the pair of slit forming members 11L and 11R come into contact with each other and hence the width of the slit is zero (the state that any light is prevented from passing through the slit).

The pair of nuts 19L and 19R each engaged with the feed screw 21 have their internal threads one of which is a left-handed thread and the other of which is a right-handed thread so that when the feed screw 21 rotates, the nuts 19L and 19R are moved toward each other or away from each other. That is, when the feed screw 21 rotates in the clockwise direction, in this example, the left side nut 19L in FIG. 6 is moved leftward and the right side nut 19R in FIG. 6 is moved rightward (the nuts 19L and 19R are moved away from each other), and on the contrary, when the feed screw 21 rotates in the counterclockwise direction, the left side nut 19L is moved rightward and the right side nut 19R is moved leftward (the nuts 19L and 19R are moved toward each other). Of course, it may be arranged that when the feed screw 21 rotates in the clockwise direction, the left side nut 19L is moved rightward and the right side nut 19R is moved leftward, and when the feed screw 21 rotates in the counterclockwise direction, the left side nut 19L is moved leftward and the right side nut 19R is moved rightward. Further, it is constructed that the pair of nuts 19L and 19R has their top surfaces that are in contact with the bottom surfaces of the corresponding slide guides 22L and 22R, respectively, and as a result, the nuts 19L and 19R are prevented from rotating about the axis of the feed screw 21 thereby to move rectilinearly.

On the bottom surfaces of the pair of carriages 14L and 14R are formed respectively channel-like grooves adapted to straddle or mount the guide rail 15 so that the carriages 14L and 14R are movably put on the guide rail 15 in a straddle-type. Each of the carriages 14L and 14R has its one side that is considerably longer in length than the minor side of each of the supports 12L and 12R, and the supports 12L and 12R are mounted on the top surfaces of the carriages 14L and 14R at the remote side positions thereof opposed to each other, respectively. At the neighboring side positions opposed to each other on the top surfaces of the carriages 14L and 14R are mounted two fastening screws 16L and 16R each side position on both sides of the guide rail 15, respectively. Tension springs 17 are spanned between the opposed fastening screws 16L and 16R of the carriages 14L and 14R, respectively, and hence both the carriages 14L and 14R are always energized toward each other by the two tension springs 17.

The pair of blocks 18L and 18R is disposed along the longitudinal direction of the guide rail 15. Pushing portions 19La and 19Ra suspended respectively from the pair of nuts 19L and 19R abut against the opposed end surfaces of the blocks 18L and 18R, respectively, thereby to control the movement of the pair of carriages 14L and 14R toward each other. That is, since the pair of carriages 14L and 14R is always in pressure contact with the pushing portions 19La and 19Ra by the elastic forces of the two tension springs 17, as the pushing portions 19La and 19Ra move, the pair of carriages 14L and 14R also move.

Further, the feed screw 21 is rotatably supported by a pair of bearings 24 mounted to the frame 23, and one end thereof projecting to the outside from the frame 23 is coupled to the pulse motor 26 of the drive part through a coupling 25.

In the variable width optical slit mechanism constructed as mentioned above, setting (adjustment) of the width of a slit that is formed between the slit forming edges 11LE and 11RE of the pair of slit forming members 11L and 11R is effected by driving the pulse motor 26. For example, in case the slit forming members 11L and 11R in the state that the slit width is zero as shown in FIGS. 6 and 8 are separated to set a required slit width, the pulse motor 26 is driven to rotate the feed screw 21, for example, in the clockwise direction thereby to move the pair of nuts 19L and 19R away from each other. As a result, the pair of blocks 18L and 18R is pushed by the pushing portions 19La and 19Ra of the pair of nuts 19L and 19R, respectively, and the pair of carriages 14L and 14R move away from each other against the elastic forces of the two springs 17. Accordingly, a slit having a required width can be formed between the slit forming edges 11LE and 11RE of the slit forming members 11L and 11R.

Further, except for the pair of slit forming members 11L and 11R, each of pairs of the slit forming member supports 12L and 12R, carriages 14L and 14R, blocks 18L and 18R, nuts 19L and 19R, and slide guides 22L and 22R is constituted by two members having substantially the same shape and size with each other and disposed in axial symmetry.

Many of variable width optical slit mechanisms of this type are constructed such that an origin signal is generated when the width of a slit is zero. In the prior art described above, the pair of slit forming members 11L and 11R are used as both slit forming members and electrodes for generating an origin signal. For this reason, both of the slit forming members 11L and 11R are electric conductors made of; for example, a metal, and as shown in FIG. 8, terminals 27L and 27R are connected to the slit forming members 11L and 11R, respectively. These terminals 27L and 27R are connected to a signal source 28 through lead wires.

In such way, since the pair of slit forming members 11L and 11R are used as electrodes for generating an origin signal as well as slit forming members, in order to prevent these slit forming members 11L and 11R from being connected to the signal source 28 via, for example, the linear guide 13, the feed screw 21, the nuts 19, and the like, it is required that the slit forming members 11L and 11R are electrically insulated. Accordingly, in the prior art discussed above, the pair of slit forming member supports 12L and 12R for supporting the pair of slit forming members 11L and 11R are made of an insulation material, for example, an insulative synthetic resin or plastic, thereby to electrically insulate the pair of slit forming members 11L and 11R from other components or members.

As described above, the pair of slit forming members 11L and 11R are long and narrow plate-like members each having a generally rectangular shape in plan and is mounted on the corresponding carriages 14L and 14R of the linear guide 13 in a cantilever manner. Moreover, the slit forming member supports 12L and 12R are mounted on the portions of the supports 12L and 12R projecting respectively from the carriages 14L and 14R.

It cannot be said that the slit forming member supports 12L and 12R made of an insulation material (synthetic resin) are good in their temperature characteristic, and so there is a disadvantage that the dependence on temperature of a slit width formed by the pair of slit forming members 11L and 11R becomes large. In addition, since the supports 12L and 12R have an insufficient rigidity, there is a problem in their mechanical stability. As a result, the prior art variable width optical slit mechanism cannot form a slit with high precision.

DISCLOSURE OF THE INVENTION

It is an object of the present invention to provide a variable width optical slit mechanism that is capable of setting the width of a slit with high precision in wide range of temperatures.

It is another object of the present invention to provide a variable width optical slit mechanism having lower dependence on temperature of a slit width and high reliability, the slit mechanism being constructed such that when the width of a slit is zero, it generates an origin signal.

In order to accomplish the aforesaid objects, in a first aspect of the present invention, there is provided a variable width optical slit mechanism which comprises: a conductive guide rail; a pair of conductive carriages that are movably mounted on the guide rail; insulative rolling elements that movably support the pair of carriages in the state that the carriages are not in contact with the guide rail; and a pair of conductive slit forming members, each being fixed to corresponding one of the pair of carriages.

In another aspect of the present invention, there is provided a variable width optical slit mechanism which comprises: an insulative guide rail; a pair of conductive carriages that are movably mounted on the guide rail; conductive rolling elements that movably support the pair of carriages on the guide rail; and a pair of conductive slit forming members, each being fixed to corresponding one of the pair of carriages.

In a preferred embodiment, the aforesaid variable width optical slit mechanism further includes: a pair of arms, each being fixed to corresponding one of the pair of carriages; an elastic element that is mounted between these arms in the state that it is electrically insulated from the arms, and energizes the carriages to move toward each other; and a pair of movable members, each abutting on corresponding one of the pair of arms and being driven, when a slit of a required width is to be formed between the pair of slit forming members, such that each movable member pushes corresponding one of the arms to move away from each other against an elastic force of the elastic element.

It may be constructed that an elastic force is directly given to the pair of carriages for serving to move them toward each other, or alternatively, it may be constructed that pushing forces are directly given to the carriages for serving to move them away from each other.

In addition, the variable width optical slit mechanism includes: a feed screw that is rotatively supported; and a pair of nuts that is engaged with the feed screw and moves rectilinearly in the direction that they move away from each other or they move toward each other by revolution of the feed screw. The movable members are mounted to the nuts, respectively.

On the pair of slit forming members are mounted respectively electrodes for generating an origin signal indicating that the width of a slit is zero. Alternatively, the pair of slit forming members may be used as both slit forming members and electrodes for generating an origin signal without providing independent electrodes for generating an origin signal.

In accordance with the present invention, the pair of slit forming member supports each made of an insulation material for insulatively supporting the pair of slit forming members comes to unnecessary. For this reason, the temperature characteristic is improved, and sufficient rigidity and high accuracy can be obtained. As a result, there is obtained a variable width optical slit mechanism that is capable of controlling the width of a slit with high accuracy in wide range of temperatures and is superior in reliability. Moreover, the construction of the optical slit mechanism can be simplified.

BEST MODE FOR CARRYING OUT THE INVENTION

Now, a preferred embodiment of the present invention will be described in detail with reference to FIGS. 1 to 5. The present invention may, however, be embodied in many different forms and should not be construed as limited to the embodiment set forth hereinafter; rather, the embodiment described later on is provided so that this disclosure will be thorough and complete, and will fully convey the scope of the invention to those skilled in the art.

Figure 1:
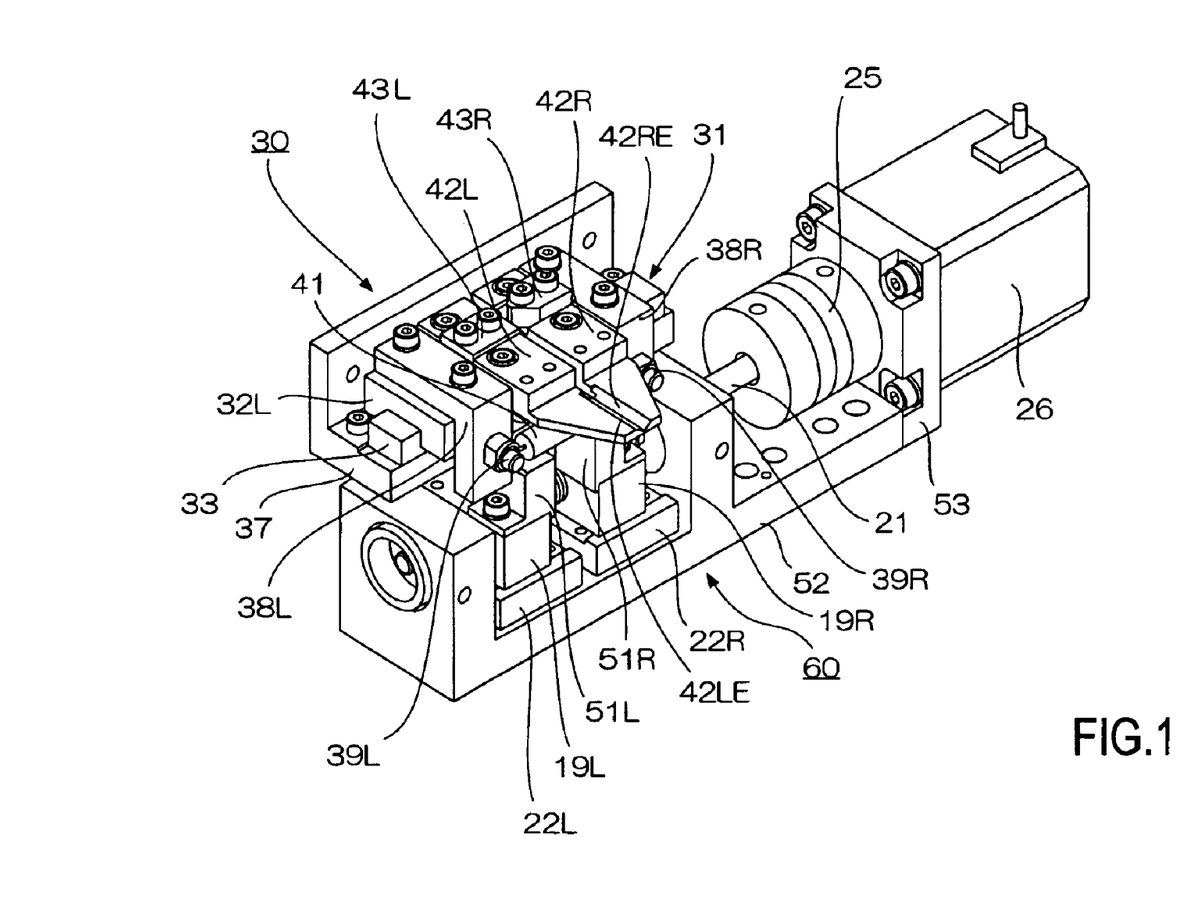
FIG. 1 is a perspective view showing the whole construction of an embodiment of the variable width optical slit mechanism according to the present invention.

FIG. 1 is a perspective view showing the whole construction of an embodiment of the variable width optical slit mechanism according to the present invention. The illustrated variable width optical slit mechanism comprises a slit forming part 30 and a drive mechanism 60, the slit forming part 30 including: a linear guide 31; a pair of arms 38L and 38R each having a generally L-shape; a tension spring 41; a pair of slit forming members 42L and 42R; a pair of electrodes 43L and 43R; and the like, and the drive mechanism 60 including: a pair of nuts 19L and 19R; a feed screw 21; a pair of slide guides 22L and 22R; a pair of movable members 51L and 51R; a pulse or stepper motor 26; and the like.

At first, the construction of the slit forming part 30 will be described with reference to FIGS. 1 to 4.

Figure 2:
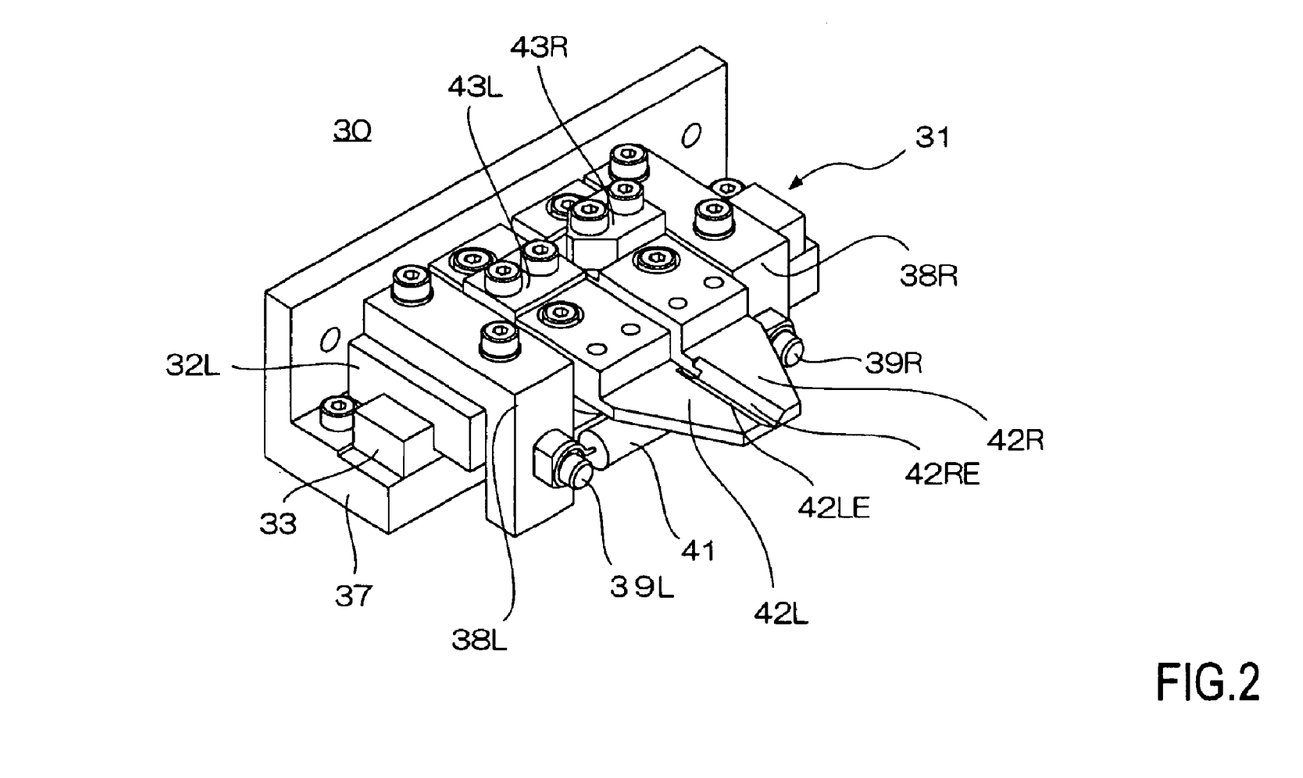
FIG. 2 is a perspective view showing a slit forming part taken out from and used in the variable width optical slit mechanism shown in FIG. 1.
Figure 3:
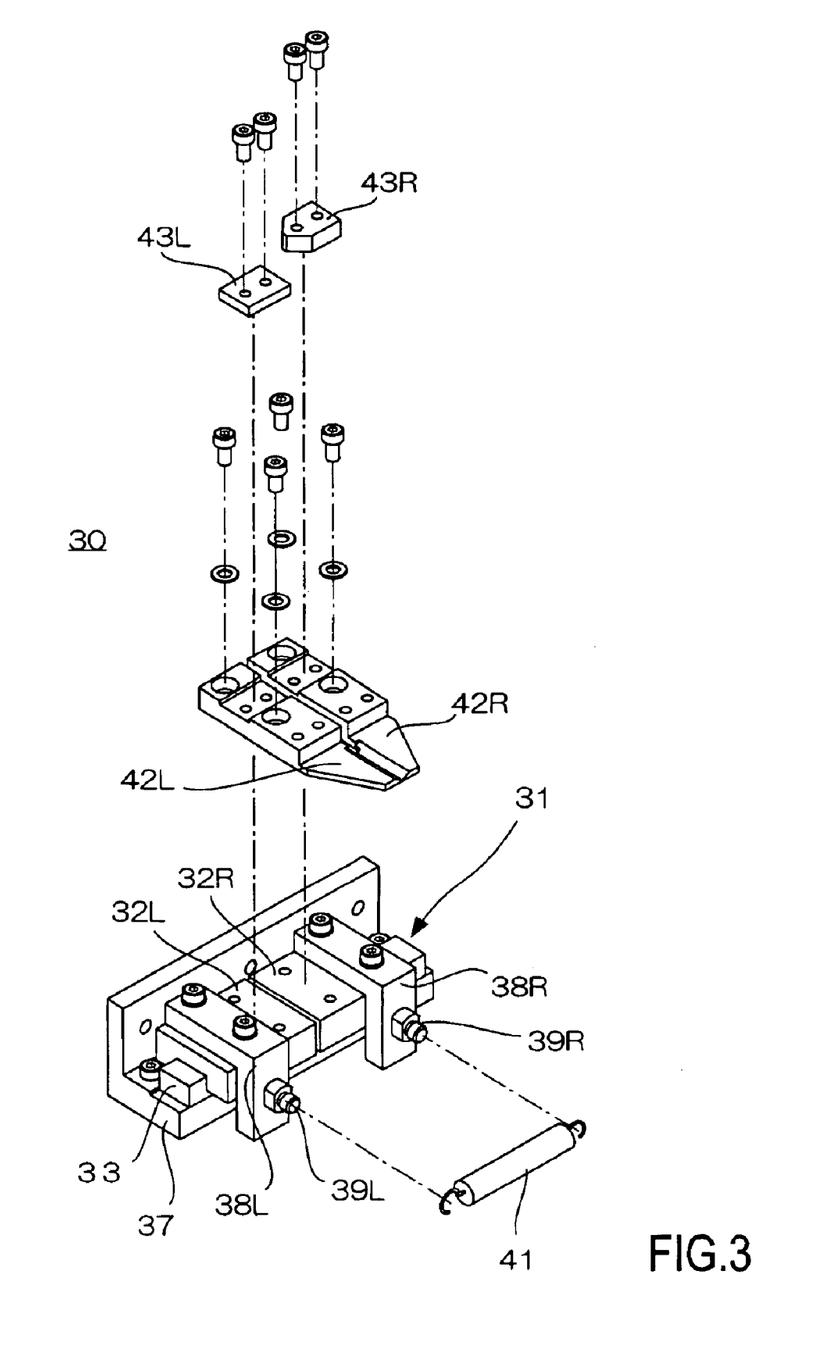
FIG. 3 is an exploded perspective view of the slit forming part shown in FIG. 2.

The linear guide 31 of the slit forming part 30 comprises: a guide rail 33 of generally rectangle in section that is mounted on the base of a slit forming part support 37 of a generally L-shape in section along the longitudinal direction of the support 37; and a pair of carriages 32L and 32R movably supported on the guide rail 33 in a straddle-type or mounted-type. As shown in FIGS. 2 and 3, horizontal legs of the arms 38L and 38R of a generally L-shape and the slit forming members 42L and 42R that are long and narrow plate-like members are mounted respectively on the top surfaces each having a generally rectangle of the carriages 32L and 32R by fastening them with screws. In this case, if it is defined that the side of a vertical side wall standing up from one side of the base of the slit forming part support 37 is the rear of the support 37 and the opposite side thereto is the front of the support 37, the pair of slit forming members 42L and 42R are mounted on the opposed positions of adjacent sides of the top surfaces of a generally rectangle of the carriages 32L and 32R in such manner that slit forming edges 42LE and 42RE each having a knife-edge shape of the slit forming members 42L and 42R are projected forward from the base of the support 37 by fastening them with screws. On the other hand, the horizontal legs of the arms 38L and 38R are mounted on the opposed positions of remote sides of the top surfaces of a generally rectangle of the carriages 32L and 32R in such manner that vertical legs of the arms 38L and 38R are suspended along the front side surfaces of the carriages 32L and 32R by fastening them with screws.

The slit forming members 42L and 42R are mounted in such manner that the slit forming edges 42LE and 42RE thereof are opposed to each other, and a slit of a required width through which a light should pass is formed between the slit forming edges 42LE and 42RE. Further, FIGS. 1 and 2 show the state that the slit forming edges 42LE and 42RE of the pair of slit forming members 42L and 42R come into contact with each other and hence the width of the slit is zero (the state that any light is prevented from passing through the slit).

On the vertical legs of the pair of arms 38L and 38R are mounted respectively hooks 39L and 39R each being made of an insulation material at substantially the same positions of the vertical legs, and a tension spring 41 is spanned between the hooks 39L and 39R. As a result, both the carriages 32L and 32R are always energized toward each other by the tension spring 41 and the slit forming edges 42LE and 42RE of the pair of slit forming members 42L and 42R are stopped in the state that they are in contact with each other.

In this embodiment, in order to provide independently origin signal generating electrodes for generating an origin signal when the width of a slit is zero, a pair of origin signal generating electrodes 43L and 43R are mounted on the top surfaces of the pair of slit forming members 42L and 42R by fastening them with screws. One electrodes 43L fastened on the top surface of one slit forming member 42L with screws is a conductive plate-like member having a generally rectangular shape in plan, and the other electrodes 43R fastened on the top surface of the other slit forming member 42R with screws is a conductive plate-like member having a generally pentagonal shape in plan in which the side thereof that should come into contact with the one electrode 43L is formed in a chevron protruding toward the one electrode 43L. In this embodiment, the other electrode 43R is thicker in its thickness than the one electrode 43L. These electrodes 43L and 43R are in contact with each other when the slit forming edges 42LE and 42RE of the pair of slit forming members 42L and 42R are in the state that they are in contact with each other.

The pair of arms 38L and 38R may be made of a metal such as a stainless steel or the like, and the pair of slit forming members 42L and 42R may also be made of a metal such as a stainless steel or the like. In addition, the pair of electrodes 43L and 43R may be made of a metal such as a beryllium copper or the like, and it is preferable that they are plated with gold all over the surfaces thereof. It is needless to say that materials are not limited thereto.

Figure 4:
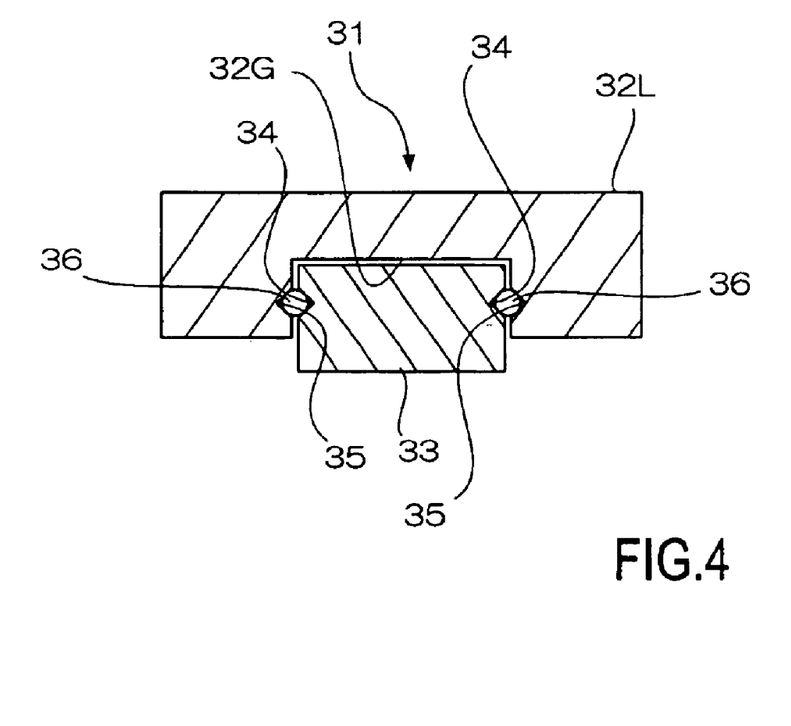
FIG. 4 is a sectional view showing a linear guide taken out from and used in the slit forming part shown in FIG. 2.

Since the pair of carriages 32L and 32R is members that have substantially the same shape, structure, and size with each other, only one carriage 32L is shown in FIG. 4 as a representative thereof. As shown in FIG. 4, a channel-like groove 32G is formed on the bottom surface of the carriage 32L, the channel-like groove 32G being inserted onto the guide rail 33 with a play or clearance therebetween. V-shaped grooves 34, 34 are formed on both side surfaces of the guide rail 33 at the same positions thereof, respectively, the V-shaped grooves 34, 34 extending along the longitudinal direction of the guide rail 33. On both side surfaces of the groove 32G of the carriage 32L are formed V-shaped grooves 35, 35 that face the V-shaped grooves 34, 34, respectively. By putting rolling elements 36 between the opposed V-shaped grooves 34 and 35, the carriage 32L is supported movably along the guide rail 33 in the state that it is not in contact with the guide rail 33. Accordingly, the V-shaped grooves 35, 35 to be formed respectively on both side surfaces of the groove 32G of the carriage 32L are formed at positions thereof where the horizontal plane of the groove 32G of the carriage 32L is not in contact with the top surface of the guide rail 33 when the rolling elements 36 are put between the opposed V-shaped grooves 34 and 35 respectively.

It goes without saying that the other carriage 32R also has V-shaped grooves formed on both side surfaces of its channel-like groove, these V-shaped grooves facing the V-shaped grooves 34, 34 of the guide rail 33, respectively, and that the carriage 32R is supported movably along the guide rail 33 in the state that it is not in contact with the guide rail 33 by putting rolling elements 36 between the opposed V-shaped grooves.

The rolling elements 36 are minute or small balls and a required number of balls are put in the V-shaped grooves of each of the carriages 32L and 32R. Each of the V-shaped grooves of each carriage 32L or 32R has a structure that both ends thereof are closed thereby to prevent any rolling element from escaping from the groove, and hence the rolling elements 36 are held within the V-shaped grooves of each carriage 32L or 32R.

In this embodiment, there are used the guide rail 33 and the pair of carriages 32L and 32R each of which is made of a metal such as a stainless steel or the like, whereas the rolling elements 36 are made of a hard insulation material such as a ceramic or the like. However, it is needless to say that materials are not limited thereto.

By assembling the components described above as shown in FIG. 3, the slit forming part 30 having its appearance shown in FIG. 2 is constructed. In this slit forming part 30, as described above, the pair of carriages 32L and 32R is always energized toward each other by an elastic force of the tension spring 41 and therefore, they are stopped in the state that the slit forming edges 42LE and 42RE of the pair of slit forming members 42L and 42R are in contact with each other so that the width of a slit is zero. At that time, the pair of electrodes 43L and 43R is in contact with each other.

Next, the construction of the drive mechanism 60 will be described with reference to FIGS. 1 and 5.

Figure 5:
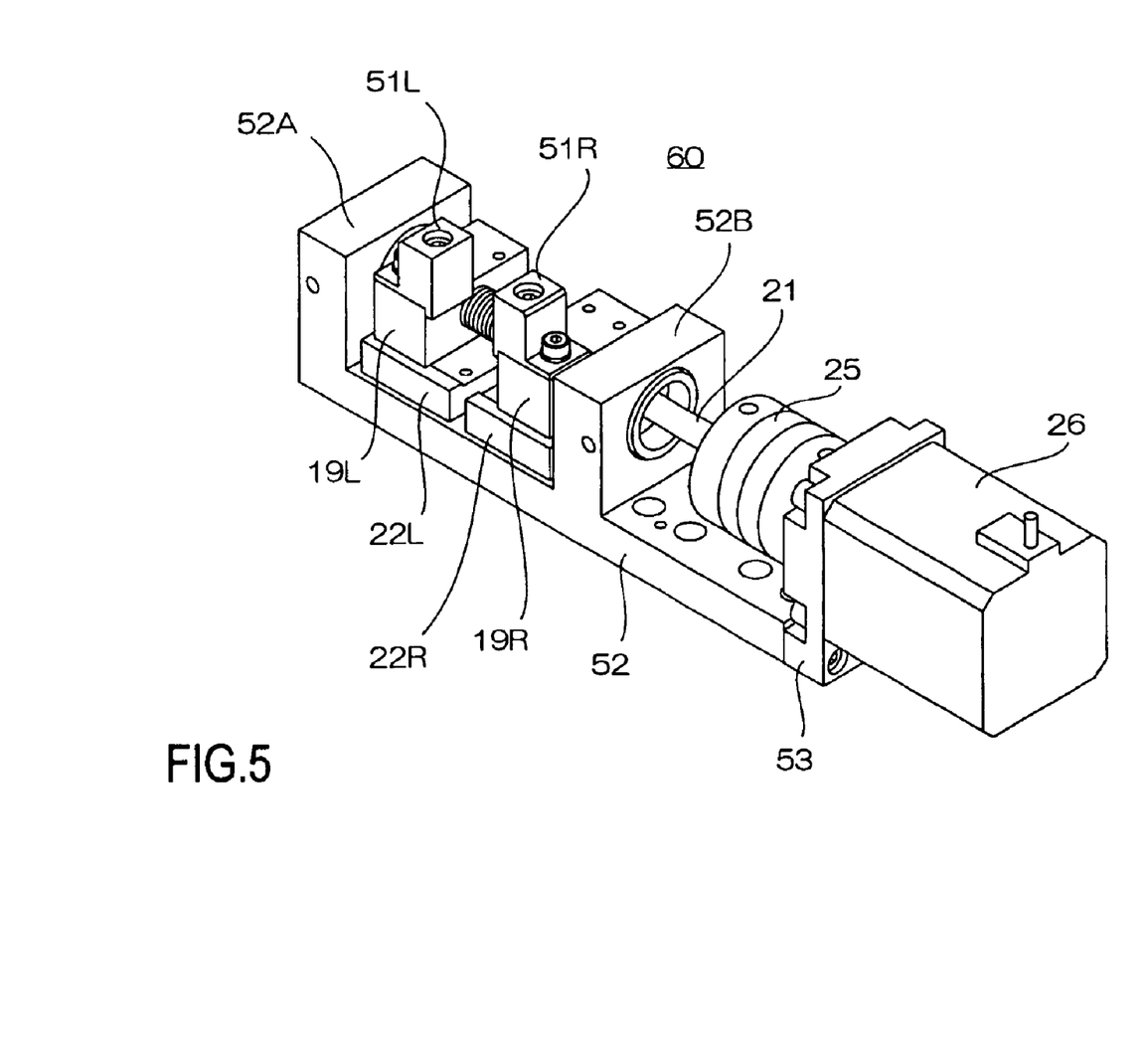
FIG. 5 is a perspective view showing a drive mechanism taken out from and used in the variable width optical slit mechanism shown in FIG. 1.

Since this drive mechanism 60 has basically the same construction as that of the drive mechanism in the prior art variable width optical slit mechanism shown in FIGS. 6 to 8, portions and elements (members) in FIGS. 1 and 5 corresponding to those in FIGS. 6 to 8 will be denoted by the same reference characters attached thereto and explanation thereof will be omitted unless necessary.

In this embodiment, too, the pair of nuts 19L and 19R each engaged with the feed screw 21 has their internal threads one of which is a left-handed thread and the other of which is a right-handed thread so that when the feed screw 21 rotates, the nuts 19L and 19R are moved toward each other or away from each other. That is, when the feed screw 21 rotates in the clockwise direction, in this example, the left side nut 19L in FIG. 5 is moved leftward and the right side nut 19R in FIG. 5 is moved rightward (the nuts 19L and 19R are moved away from each other), and on the contrary, when the feed screw 21 rotates in the counterclockwise direction, the left side nut 19L is moved rightward and the right side nut 19R is moved leftward (the nuts 19L and 19R are moved toward each other). Of course, it may be arranged that when the feed screw 21 rotates in the clockwise direction, the left side nut 19L is moved rightward and the right side nut 19R is moved leftward, and when the feed screw 21 rotates in the counterclockwise direction, the left side nut 19L is moved leftward and the right side nut 19R is moved rightward.

The feed screw 21 is rotatably supported by a pair of bearings one of which is mounted to a vertical wall 52A standing up from one end of a long and narrow base member 52 having a generally rectangular shape in plan in the longitudinal direction thereof and the other of which is mounted to another vertical wall 52B standing up from a mid portion of the base member 52. The pair of nuts 19L and 19R is put between these vertical walls 52A and 52B and is engaged with the feed screw 21 with a predetermined interval therebetween. It is constructed that the nuts 19L and 19R have their bottom surfaces that are in contact with the top surfaces of the corresponding slide guides 22L and 22R fixed on the base member 52, respectively, and as a result, the nuts 19L and 19R are prevented from rotating about the axis of the feed screw 21 thereby to move rectilinearly.

On the top surfaces of the pair of nuts 19L and 19R are mounted respectively the block-like movable members 51L and 51R by fastening them with screws. As can be understood from FIG. 1, when the drive mechanism 60 and the aforesaid slit forming part 30 are assembled, these movable members 51L and 51R are fastened on the top surfaces of the corresponding nuts 19L and 19R at predetermined positions thereof with screws in such manner that the opposed outer side surfaces of the movable members 51L and 51R abut on the opposed inner side surfaces of the vertical legs of the pair of arms 38L and 38R suspended from the horizontal legs thereof, respectively.

In this embodiment, the pair of movable members 51L and 51R is made of a stainless steel and there are used the movable members 51L and 51R each having an insulative film or coating formed on all over surface thereof. In addition, there are used the feed screw 21 and the pair of slide guides 22L and 22R each of which is made of a stainless steel, and the pair of nuts 19L and 19R each made of a phosphor bronze is used. However, these materials are merely shown by way of example, and it goes without saying that other materials may be used.

A holder 53 onto which the pulse motor 26 is mounted is fixed to the other end of the base member 52, and the feed screw 21 is coupled to the pulse motor 26 through a coupling 25.

In the construction discussed above, when the feed screw 21 is rotated by driving the pulse motor 26, the pair of nuts 19L and 19R rectilinearly moves away from each other or toward each other along the slide guides 22L and 22R. Consequently, the pair of movable members 51L and 51R fixed to the nuts 19L and 19R rectilinearly moves away from each other or toward each other concurrently with the nuts 19L and 19R.

The slit forming part 30 and the drive mechanism 60 both constructed as discussed above are arranged such that the opposed outer side surfaces of the movable members 51L and 51R abut on the end portions of the opposed inner side surfaces of the vertical legs suspended from the horizontal legs of the pair of arms 38L and 38R, respectively, the end portions being positioned below the carriages 32L and 32R, as shown in FIG. 1. Such relationship of arrangement can be easily obtained by mounting and fixing the support 37 having a generally L-shape of the slit forming part 30 and the base member 52 of the drive mechanism 60 on a predetermined place on a frame or the like of an apparatus using this slit mechanism, though not shown. Further, terminals for taking out an origin signal, lead wires, and the like are not shown.

In the variable width optical slit mechanism constructed as described above, in case both the slit forming members 42L and 42R in the state that the slit width is zero as shown in FIG. 1 are separated to set a required slit width, for example, the pulse motor 26 is driven to rotate the feed screw 21, for example, in the clockwise direction thereby to move the pair of nuts 19L and 19R away from each other. As a result, the pair of movable members 51L and 51R pushes the corresponding vertical legs of the pair of arms 38L and 38R, and hence the pair of carriages 32L and 32R moves away from each other against the elastic force of the tension spring 41. Accordingly, a slit having a required width can be formed between the slit forming edges 42LE and 42RE of the slit forming members 11L and 11R.

On the other hand, when the pulse motor 26 is reversely rotated from this state thereby to rotate the feed screw 21, for example, in the counterclockwise direction and to move the pair of nuts 19L and 19R toward each other, the pair of movable members 51L and 51R also moves toward each other. As a result, the pair of carriages 32L and 32R moves toward each other by a tension force of the spring 41 together with the movement of the movable members 51L and 51R so that the slit width between the slit forming edges 42LE and 42RE becomes narrower. When the slit forming edges 42LE and 42RE come into contact with each other so that the slit width becomes zero, the pair of electrodes 43L and 43R comes into contact with each other, and therefore, an origin signal indicating that the slit width is zero is generated.

In the embodiment, the pair of electrodes 43L and 43R is directly mounted on the pair of slit forming members 42L and 42R each made of a metal, respectively, and further, these slit forming members 42L and 42R are directly mounted on the pair of carriages 32L and 32R each made of a metal, respectively. However, since the rolling elements 36 lying between the pair of carriages 32L and 32R and the guide rail 33 are made of an insulation material and the pair of carriages 32L and 32R is movably supported by the rolling elements 36 each made of an insulation material in the state that the carriages 32L and 32R are not in contact with the guide rail 33, it does not occur that both the carriages 32L and 32R are electrically connected to each other through the guide rail 33 made of a metal. Therefore, there is also no possibility that the pair of slit forming members 42L and 42R on which the pair of electrodes 43L and 43R is mounted is connected to each other through the linear guide 31.

In addition, the pair of arms 38L and 38R each made of a metal is directly mounted on the pair of carriages 32L and 32R, and the spring 41 is spanned between these arms 38L and 38R, and the vertical legs of the arms 38L and 38R are in contact with the movable members 51L and 51R of the drive mechanism 60, respectively. However, the spring 41 is spanned between the arms 38L and 38R through the insulative hooks 39L and 39R, respectively, and further, the movable members 51L and 51R each made of a metal have their insulative films formed all over the surfaces thereof. Accordingly, the vertical legs of the arms 38L and 38R are electrically insulated from the movable members 51L and 51R, and hence it does not occur that the arms 38L and 38R are electrically connected to each other through the spring 41 and/or the drive mechanism 60. Therefore, there is also absolutely no possibility that the slit forming members 42L and 42R on which the electrodes 43L and 43R are mounted is electrically connected to each other through the spring 41 and/or the drive mechanism 60.

Further, in the embodiment, though the pair of electrodes 43L and 43R for generating an origin signal are provided independently of the pair of slit forming members 42L and 42R, it is needless to say that the pair of slit forming members 42L and 42R may be used as both slit forming members and electrodes without providing independent electrodes, as in the afore mentioned prior art shown in FIGS. 6 to 8. In addition, though the slit forming edges 42LE and 42RE of the slit forming members 42L and 42R defining the width of a slit are arranged in the orthogonal direction to the traveling direction of the pair of slit forming members 42L and 42R, the slit forming edges 42LE and 42RE may be arranged in the direction slanted at a predetermined angle of θ to the traveling direction of the pair of slit forming members 42L and 42R, as in the prior art shown in FIGS. 6 to 8.

With the construction described above, in either case the pair of slit forming members 42L and 42R are used as electrodes for generating an origin signal as well as slit forming members or separate electrodes are mounted on the slit forming members 42L and 42R, the slit forming member supports that are indispensable to the prior art variable width optical slit mechanism comes to unnecessary. In addition, in order to secure the insulation between both electrodes, it is no need to use the slit forming member supports each made of an insulative synthetic resin. Therefore, good temperature characteristic can be obtained. Moreover, the pair of slit forming members 42L and 42R and the pair of arms 38L and 38R are directly mounted on the carriages 32L and 32R, and there are no members or elements that are mounted on the carriages 32L and 32R in a cantilever manner. In addition, members each made of a synthetic resin that are inferior in temperature characteristic and rigidity, and furthermore in accuracy are not used, but members each made of, for example, a metal are used. As a result, sufficient rigidity can be obtained and the optical slit mechanism is mechanically stable. Thus, a slit can be formed with high accuracy in wide range of temperatures. Furthermore, the construction of the optical slit mechanism can be simplified.

Further, in the embodiment described above, in order to prevent the pair of slit forming members 42L and 42R on which the pair of electrodes 43L and 43R are mounted from being electrically connected to each other through the linear guide 31, the rolling elements 36 each made of a hard insulator are used, but in case each of the rolling elements 36 is made of a metal without being made of an insulator and the guide rail 33 is made of a hard insulation material such as ceramic or the like, the same function and effects can be obtained. In this case, there is obtained further advantage that there is no need to support the pair of carriages 32L and 32R in the state that they are not in contact with the guide rail 33 by the rolling elements 36. It is preferable that the rolling elements 36 are made of a metal such as a stainless steel, bearing metal (steel) or the like that is generally used in a linear guide of this type.

In addition, though it is constructed that the arms 38L and 38R are mounted on the carriages 32L and 32R, respectively, and that an elastic force is given to the carriages 32L and 32R via the arms 38L and 38R for serving to move the carriages 32L and 32R toward each other, it may be constructed that an elastic force is directly given to the carriages 32L and 32R for serving to move them toward each other, or alternatively, it may be constructed that pushing forces are directly given to the carriages 32L and 32R for serving to move them away from each other.

As is clear from the foregoing, according to the present invention, the pair of slit forming member supports each made of an insulation material for insulatively supporting the pair of slit forming members comes to unnecessary. For this reason, the variable width optical slit mechanism can be constructed without use of members each made of an insulation material that are inferior in temperature characteristic and rigidity, and furthermore in accuracy. As a result, there is obtained a variable width optical slit mechanism that is capable of controlling the width of a slit with high accuracy in wide range of temperatures and is superior in reliability. Moreover, since the pair of slit forming member supports becomes unnecessary, the construction of the optical slit mechanism can be simplified.

Accordingly, if the variable width optical slit mechanism according to the present invention is used in, for example, an optical spectrum analyzer, there is obtained an advantage that the resolving power or resolution of the optical spectrum analyzer can be set with high precision in wide range of temperatures.

While the present invention has been described with regard to the preferred embodiment shown by way of example, it will be apparent to those skilled in the art that various modifications, alterations, changes, and/or minor improvements of the embodiment described above can be made without departing from the spirit and the scope of the present invention. Accordingly, it should be understood that the present invention is not limited to the illustrated embodiment, and is intended to encompass all such modifications, alterations, changes, and/or minor improvements falling within the scope of the invention defined by the appended claims.

What is claimed is:

1. A variable width optical slit mechanism comprises:
   a fixed conductive guide rail;
   a pair of conductive carriages that are movably mounted on said guide rail;
   a plurality of insulative rolling elements between the guide rail and each of the conductive carriages that movably support said pair of carriages along a longitudial direction of the guide rail in the state that the carriages are not in contact with the guide rail; and
   a pair of conductive slit forming members, each being fixed to corresponding one of the pair of carriages.

2. A variable width optical slit mechanism comprises:
   an insulative guide rail;
   a pair of conductive carriages that are movably mounted on said guide rail;
   conductive rolling elements that movably support said pair of carriages on the guide rail; and
   a pair of conductive slit forming members, each being fixed to corresponding one of the pair of carriages.

3. The slit mechanism as set forth in claim 1 or 2, further including an elastic element that gives to the pair of carriages an elastic force for energizing the carriages to move toward each other, and wherein the pair of slit forming members is always held in the state that they are in contact with each other.

4. The slit mechanism as set forth in claim 1 or 2, further including:
   a pair of arms, each being fixed to corresponding one of the pair of carriages; and
   an elastic element that is mounted between these arms in the state that it is electrically insulated from the arms, and energizes the pair of carriages to move toward each other.

5. The slit mechanism as set forth in any one of claims 1 to 2, wherein electrodes for generating an origin signal indicating that the width of a slit is zero are mounted on the pair of slit forming members, respectively.

6. The slit mechanism as set forth in claim 3, further including means for giving to the pair of carriages pushing force for energizing the carriages to move away from each other.

7. The slit mechanism as set forth in claim 4, further including a pair of movable members, each abutting on corresponding one of the pair of arms and being driven, when a slit of a required width is to be formed between the pair of slit forming members, such that each movable member pushes corresponding one of the pair of arms to move away from each other against an elastic force of the elastic element.

8. The slit mechanism as set forth in claim 7, further including:
   a feed screw that is rotatively supported; and
   a pair of nuts that is engaged with said feed screw and moves rectilinearly in the direction that they move away from each other or they move toward each other by revolution of the feed screw; and wherein
   the movable members are mounted to said nuts, respectively.

9. The slit mechanism as set forth in any one of claim 3 or 4, wherein electrodes for generating an origin signal indicating that the width of a slit is zero are mounted on the pair of slit forming members, respectively.

* * * * *

UNITED STATES PATENT AND TRADEMARK OFFICE
CERTIFICATE OF CORRECTION

PATENT NO. : 6,956,688 B2
DATED : October 18, 2005
INVENTOR(S) : Sakae Hoshino It is certified that error appears in the above-identified patent and that said Letters Patent is hereby corrected as shown below:

Column 12,
Line 62, "any one of claim 3 or 4" should be -- claim 4 --.

Signed and Sealed this

Twenty-seventh Day of December, 2005

JON W. DUDAS
*Director of the United States Patent and Trademark Office*